United States Patent
Poole et al.

(10) Patent No.: US 10,671,889 B2
(45) Date of Patent: Jun. 2, 2020

(54) COMMITTED INFORMATION RATE VARIATIONAL AUTOENCODERS

(71) Applicant: DeepMind Technologies Limited, London (GB)

(72) Inventors: Benjamin Poole, Palo Alto, CA (US); Aaron Gerard Antonius van den Oord, London (GB); Ali Razavi-Nematollahi, London (GB); Oriol Vinyals, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/586,014

(22) Filed: Sep. 27, 2019

(65) Prior Publication Data

US 2020/0104640 A1     Apr. 2, 2020

Related U.S. Application Data

(60) Provisional application No. 62/737,845, filed on Sep. 27, 2018.

(51) Int. Cl.
| | |
|---|---|
| *G06K 9/62* | (2006.01) |
| *G06N 3/08* | (2006.01) |
| *G06N 3/04* | (2006.01) |
| *G06N 7/00* | (2006.01) |

(52) U.S. Cl.
CPC ......... *G06K 9/6257* (2013.01); *G06N 3/0454* (2013.01); *G06N 3/084* (2013.01); *G06N 7/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,043,512 | B2 * | 8/2018 | Jaitly | G06F 40/58 |
| 10,133,739 | B2 * | 11/2018 | Le | G10L 15/02 |
| 10,181,098 | B2 * | 1/2019 | Vinyals | G06N 3/02 |
| 10,229,111 | B1 * | 3/2019 | Filippova | G06F 40/30 |
| 10,268,671 | B2 * | 4/2019 | Kaiser | G10L 25/30 |
| 10,304,477 | B2 * | 5/2019 | van den Oord | G10L 13/06 |

(Continued)

OTHER PUBLICATIONS

Abadi et al.,"Tensorflow: A system for largescale machine learning," In Proceedings of the 12th USENIX Conference on Operating Systems Design and Implementation, Nov. 2016, 21 pages.

(Continued)

*Primary Examiner* — Michael B Holmes
(74) *Attorney, Agent, or Firm* — Fish & Richardson P.C.

(57) ABSTRACT

A variational autoencoder (VAE) neural network system, comprising an encoder neural network to encode an input data item to define a posterior distribution for a set of latent variables, and a decoder neural network to generate an output data item representing values of a set of latent variables sampled from the posterior distribution. The system is configured for training with an objective function including a term dependent on a difference between the posterior distribution and a prior distribution. The prior and posterior distributions are arranged so that they cannot be matched to one another. The VAE system may be used for compressing and decompressing data.

16 Claims, 5 Drawing Sheets

(56) References Cited

U.S. PATENT DOCUMENTS

| | | | | |
|---|---|---|---|---|
| 10,402,719 | B1 * | 9/2019 | Vinyals | G06N 3/0445 |
| 10,409,908 | B2 * | 9/2019 | Vinyals | G06F 40/205 |
| 10,417,557 | B2 * | 9/2019 | Bengio | G06N 3/0454 |
| 10,504,023 | B1 * | 12/2019 | Bengio | G06N 3/08 |
| 10,540,962 | B1 * | 1/2020 | Chan | G06F 40/197 |

OTHER PUBLICATIONS

Alemi et al., "Fixing a Broken ELBO," arXiv, Feb. 2018, 21 pages.
Alemi et al., Uncertainty in the variational information bottleneck, arXiv, Jul. 2018, 10 pages.
Ba et al., "Layer normalization," arXiv, Jul. 2016, 14 pages.
Babaeizadeh et al.,"Stochastic variational video prediction," arXiv, Mar. 2018, 15 pages.
Boesen et al., "Autoencoding beyond pixels using a learned similarity metric," arXiv, Feb. 2016, 8 pages.
Bowman et al., "Generating Sentences from a Continuous Space," arXiv, May 2016, 12 pages.
Chelba et al., "One billion word benchmark for measuring progress in statistical language modeling," arXiv, Mar. 2014, 6 pages.
Chen et al., "PixelSNAIL: An Improved Autoregressive Generative Model," arXiv, Dec. 2017, 6 pages.
Chen et al.,"Variational Lossy Autoencoder," arXiv, Mar. 2017, 17 pages.
Chung et al., "A Recurrent Latent Variable Model for Sequential Data," Apr. 2016, 9 pages.
cs.toronto.edu [online],"Cifar-10 (canadian institute for advanced research)", Sep. 2019, published on or before Sep. 27, 2018, retrieved from URL<http://www.cs.toronto.edu/~kriz/cifar.html>, 4 pages.
Davidson et al.,"Hyperspherical variational auto-encoders," arXiv, Sep. 2018, 18 pages.
Deng et al., "ImageNet: A Large-Scale Hierarchical Image Database," 2009 IEEE conference on computer vision and pattern recognition, Jun. 2009, 8 pages.
Denton et al.,"Stochastic video generation with a learned prior," arXiv, Mar. 2018, 12 pages.
Dieng et al., "Avoiding latent variable collapse with generative skip models," arXiv, Jan. 2019, 9 pages.
Goyal et al., "Z-Forcing: Training Stochastic Recurrent Networks," arXiv, Nov. 2017, 11 pages.
Graves et al., "Associative Compression Networks for Representation Learning," arXiv, Apr. 2018, 13 pages.
Gregor et al., "Towards conceptual compression," Advances in Neural Information Processing Systems, Dec. 2015, 9 pages.
Gulrajani et al., "PixelVAE: A Latent Variable Model for Natural Images," arXiv, Nov. 2016, 9 pages.
Guu et al., "Generating Sentences by Editing Prototypes," arXiv, Sep. 2018, 14 pages.
Higgins et al.,"Learning Basic Visual Concepts with a Constrained Variational Framework," ICLR, Apr. 2017, 13 pages.
Hoffman et al., "ELBO surgeryy: yet another way to carve up the variational evidence lower bound," Workshop in Advances in Approximate Bayesian Inference, NIPS, Dec. 2016, 4 pages.
Kim et al., "Semi-amortized variational autoencoders," arXiv, Jul. 2018, 13 pages.
Kingma et al., "Adam: A method for stochastic optimization," arXiv, Jan. 2017, 15 pages.
Kingma et al., "Auto-encoding variational bayes," arXiv, May 2014, 14 pages.
Kingma et al., Improving Variational Inference with Inverse Autoregressive Flow, arXiv, Jan. 2017, 16 pages.
Larsen et al., "Autoencoding beyond pixels using a learned similarity metric," arXiv, Feb. 2016, 8 pages.
Lucas et al., "Auxiliary guided autoregressive variational autoencoders," arXiv, Apr. 2019, 16 pages.
Maaten et al., "Visualizing high-dimensional data using t-sne," Journal of machine learning research, Nov. 2008, 27 pages.
Oord et al., "Conditional Image Generation with PixelCNN Decoders," arXiv, Jun. 2016, 13 pages.
Oord et al., "Neural discrete representation learning," arXiv, May 2018, 11 pages.
Oord et al., "Pixel recurrent neural networks," arXiv, Aug. 2016, 11 pages.
Oord et al., "WaveNet: A Generative Model for Raw Audio," arXiv, Sep. 2016, 15 pages.
Ostrovski et al., "Autoregressive Quantile Networks for Generative Modeling," Proceedings of the 35th International Conference on Machine Learning, Jul. 2018, 10 pages.
Parmar et al., "Image Transformer, " arXiv, Jun. 2018, 10 pages.
Reed et al., "Few-shot Autoregressive Density Estimation: Towards Learning to Learn Distributions," arXiv, Feb. 2018, 11 pages.
Rezende et al., "Stochastic Backpropagation and Approximate Inference in Deep Generative Models," arXiv, Mary 2014, 14 pages.
Rezende et al., "Taming VAEs," arXiv, Oct. 2018, 21 pages.
Rezende et al., "Variational inference with normalizing flows," Proceedings of the 32 nd International Conference on Machine Learning, Jul. 2015, 9 pages.
Roy et al., "Theory and experiments on vector quantized autoencoders," arXiv, Jul. 2018, 11 pages.
Salismans et al., "PixelCNN++: Improving the PixelCNN with Discretized Logistic Mixture Likelihood and Other Modifications," arXiv, Jan. 2017, 10 pages.
Tomczak et al., "VAE with a vampprior," arXiv, Feb. 2018, 16 pages.
Turner et al., "A maximum-likelihood interpretation for slow feature analysis," Neural computation, Apr. 2007, 17 pages.
Vaswani et al., "Attention Is All You Need," arXiv, Dec. 2017, 15 pages.
Vaswani et al., "Tensor2tensor for neural machine translation," arXiv, Mar. 2018, 9 pages.
Wiskott et al., "Slow feature analysis: Unsupervised learning of invariances," Neural computation, MIT Press, Apr. 2002, 56 pages.
Xu et al., "Spherical latent spaces for stable variational autoencoders, " arXiv, Oct. 2018, 11 pages.
Yang et al., "Improved Variational Autoencoders for Text Modeling using Dilated Convolutions," arXiv, Jun. 2017, 12 pages.
Zhao et al., "InfoVAE: Balancing Learning and Inference in Variational Autoencoders," arXiv, May 2018, 14 pages.

* cited by examiner

COMMITTED INFORMATION RATE VARIATIONAL AUTOENCODERS

CROSS-REFERENCE TO RELATED APPLICATION

This application claims priority to U.S. Provisional Application No. 62/737,845, filed on Sep. 27, 2018. The disclosure of the prior application is considered part of and is incorporated by reference in the disclosure of this application.

BACKGROUND

This specification relates to variational autoencoder neural network systems and to components thereof.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In broad terms a variational autoencoder (VAE) determines a distribution for a set of latent variables representing an input data item, x. Thus the encoder determines parameters of a posterior distribution $q(z|x)$ over the latent variables z. The VAE is trained with an objective which encourages the system to keep the posterior distribution close to a prior $p(z)$, generally a standard Gaussian. A sample can be drawn from this distribution to generate an output data item. The VAE may be trained using unlabeled data. The objective may include a term, such as a KL (Kullback-Leibler) divergence, which measures the difference between the posterior and prior distributions. However a problem with some VAE implementations, in particular those with powerful decoders, is that the decoder may be able to generate the output data item without relying on the latent variables.

In one innovative aspect therefore there is provided a variational autoencoder neural network system. The system may be implemented as computer programs on one or more computers in one or more locations.

The system may comprise an input to receive an input data item, such as an image, e.g., from a camera or LIDAR system, digitized sound, or text. The system may further comprise an encoder neural network configured to encode the input data item to determine a set of parameters defining a first, posterior distribution of a set of latent variables. The system may further comprise a subsystem to sample from the posterior distribution to determine values of the set of latent variables. The system may further comprise a decoder neural network configured to receive the values of the set of latent variables and to generate an output data item representing the values of the set of latent variables. The variational autoencoder neural network system may configured for training with an objective function. This may have a first term, such as a cross-entropy term, dependent upon a difference between the input data item and the output data item and a second term, such as a KL divergence term, dependent upon a difference between the posterior distribution and a second, prior distribution of the set of latent variables. The prior distribution may different to the posterior distribution; more particularly a structure of the prior distribution may different to a structure of the posterior distribution so that the posterior distribution cannot be matched to the prior distribution.

In implementations information which is transferred from the encoder to the decoder may be manifest as a non-zero divergence between the posterior and prior distributions. The divergence may be a KL divergence, a Jensen-Shannon divergence, or some other difference metric.

By imposing a different structure on the posterior and prior distributions the second term of the objective function may be guaranteed to be non-zero, and hence the decoder may be forced to rely on the latent variables when generating an output data item.

The structure of a distribution may be determined by its inherent shape which may be determined for example by its mathematical form, and/or it may be determined by parameters of the distribution. Thus the posterior and prior distributions may be defined to have different structures by fixing one or more parameters of the distributions to be different to one another. For example where the distributions have the same or a similar mathematical form the distributions may be constrained to be structurally to be different to one another by constraining one or more parameters of each distribution to have a different relative or absolute value.

For example the posterior distribution and the prior distribution may each comprise a multivariate Gaussian distribution. Then a variance of the posterior distribution may be a factor of a different to a variance of the prior distribution (where a ≠1). This structure for the posterior and prior distributions has an advantage of simplicity; it also facilitates determination of the KL divergence term in closed form, for example during training. In some implementations the parameter a can be determined (in closed form) from a desired committed, i.e., minimum, information rate transfer from the encoder to the decoder via the latent variables.

It is desirable to be able to use an autoregressive neural network as the decoder because such decoders can be very powerful, that is they can be capable of generating very accurate samples of data items. One example of such a system, which can be used, for example for generating images, is described in Aaron van den Oord et al., "Conditional Image Generation with PixelCNN Decoders", arXiv: 1606.05328; and in S. Reed et al., "Few-Shot Autoregressive Density Estimation: Towards Learning To Learn Distributions", arXiv 1710.10304. An example of such a system, which can be used, for example for generating sound (waveforms), is described in A. van den Oord et al. "WaveNet: A generative model for raw audio" arXiv 1609:03499. In this context an autoregressive neural network may be a neural network which is configured to generate a sequence of output data item values, $x_t$ each conditioned upon previously generated output data item values $x_{<t}$ and conditioning variables: $P(x|s;\theta) = \Pi_{t=1}^N P(x_t | x_{<t}, f(s); \theta)$. The data item values may be, for example, pixel values or sound signal values. For example, when generating an image the autoregressive neural network may generate the pixels in sequence, for example in a raster scan row by row and pixel by pixel.

However when such a powerful decoder is incorporated in a VAE the latent variables may be ignored. In implementations the above described variational autoencoder neural network system facilitates the use of such autoregressive neural network systems as the decoder whilst still using information from the latent variables. More particularly the autoregressive structure of the decoder may provide local structure for the output data item whilst the decoder output may also be conditioned on the information provided by sampling from the latent variable distribution, which may provide longer-range structure and/or global structure for the output data item.

Thus in some implementations the encoder is configured to determine a sequence of sets of parameters defining a sequence of distributions for a sequence of sets of latent variables, one for each of a plurality of time steps. Here the time steps for the encoder may be different to the sample generating steps of the decoder. For example the interval between determining successive sets of latent variables may be longer than the decoder time steps, i.e., more than one output data item value may be generated for each set of latent variables.

Thus in some implementations a sequence of sets of latent variables is generated. The prior distribution of latent variables may then comprise an autoregressive distribution such that at each time step the prior distribution depends on the prior distribution at a previous time step. The posterior distribution may, however, be determined independently at each time step. This approach can help to capture correlation in the latent space from one time step to another (where the time steps may, e.g., correspond to spatial locations in an image). The autoregressive process defining the evolution of the prior distribution of latent variables over time may be a linear autoregressive process. For example values of the set of latent variables at a time step t, $z_t$ may be defined by a sum of a times the values of the set of latent variables at a previous time step $z_{t-1}$ and a noise component, e.g., a Gaussian noise component, where $|\alpha|<1$. The parameter a defines a degree of temporal correlation in the latent variables, with less correlation as a approaches zero.

Where the decoder neural network is an autoregressive neural network the VAE may further comprise a system to restrict the values of the set of latent variables passed to the decoder at each time step to those which encode information about in the sequence of output data values yet to be generated, i.e., about future values of the sequence of output data values. Thus the values of the set of latent variables passed to the decoder may be derived from input data item values for $x_{>t}$. This is because the autoregressive neural network effectively already has access to information about past, i.e., previously generated values of the output data item. In implementations the encoder may be configured to restrict the values of the set of latent variables passed to the decoder in this way. Thus the encoder may be configured to have an "anti-causal" structure. When the VAE system is being trained the system will typically have access to a complete data item, and thus will have access to values of the data item which are later than those being generated by the decoder at any particular decoder time step, so causality is not violated. This can facilitate computational efficiency and can also allow for an increased learning rate.

The decoder may comprise a convolutional autoregressive neural network configured to implement causal convolutions, i.e., where the generated data item values depend on previously generated data item values but not on future data item values. A causal convolution may be implemented using a mask to mask the input from data item values in a sequence following those at a current time step, or by shifting the convolution location (filter length−1) time steps.

Although the system may be trained to match the posterior and prior distributions, there is a built-in mismatch which encodes information. The VAE system may thus include a system, in particular an auxiliary prior neural network, configured to learn the sequence of distributions for the sequence of sets of latent variables, i.e., configured to learn an approximate (aggregate) posterior distribution. The auxiliary prior neural network may be an autoregressive neural network, and may be trained concurrently with the encoder neural network and decoder neural network.

There is also provided a method of training a variational autoencoder neural network system as described above, which may be unsupervised. The method may comprise receiving training data, the training data comprising training data items; providing each training data item to the input of the variational autoencoder neural network system to generate a corresponding output data item; and determining a gradient of the objective function from a difference between the training data item and the corresponding output data item and from a difference between the posterior distribution and the prior distribution of the set of latent variables. The training data items may be processed in batches. The method may further comprise backpropagating the gradient through the variational autoencoder neural network system to adjust parameters of the encoder neural network and of the decoder neural network to optimize the objective function.

In broad terms the training may employ stochastic gradient descent (SGD) with an objective which includes a reconstruction cost and a closed-form KL divergence term. The gradients may be back-propagated through the decoder into the encoder using the "reparameterization trick" (see, e.g., Kingma and Welling 2013, arXiv1312.6114), in which a sampling node is replaced by a deterministic operation with a noise input to allow a gradient to flow through the node. The objective function, which defines a built-in difference between the posterior and prior distributions ensures a (minimum) rate of information flow via the latent variables from the encoder to the decoder.

The VAE system during training includes both the encoder and decoder. However, once trained, each of these may have independent utility.

For example because the latent variable distribution effectively defines a compressed version of the input data item the encoder may be used to compress data items of the same type as used to train the VAE system. In another example, the encoder may be used as a front end for another machine learning system, for example a classifier. Because the encoder has learned the distribution of the training data items a classifier trained/operating on the latent variables may perform better than a classifier trained on the raw data items. In another example the encoder may be used as a front end for a reinforcement learning (RL) system in which the learned latent variable distribution is used to represent an image of an environment in which the RL system operates and/or to encode other sensor data such as data representing state of a mechanical agent such as the configuration of a robot arm. Although examples have been described using sound and image data, the VAE system may also be trained on video data and thus the trained encoder may encode or compress video data.

The decoder of the trained system may also have independent utility. For example a sample may be drawn from the prior and provided to the decoder to generate a sample output data item. In a system with an auxiliary neural network a sample may be provided to the auxiliary neural network to generate a sequence of latent variables which may then be provided to the decoder to generate a sample output data item. A generated data item may be a one dimensional data item such as a sound, in which case the latent variables may have a 1D feature space and the data item values may comprise values defining a sound waveform. A generated data item may be a two dimensional data item such as an image, in which case the latent variables may have a 2D feature space and the data item values may comprise pixel values for the image such as brightness and/or color values. A generated data item may be a three dimensional data item such as an image sequence (video), in which case the latent variables may have a 3D feature space and the data item values may comprise pixel values for the image sequence (video). In the case of video the decoder may be an image decoder. For example, the VAE system could be trained to generate images conditional upon an additional data input defining movement/change of a viewpoint and then a sequence of sets of latent variables could be generated by applying a succession of such additional data inputs, each image being generated independently from a respective set of latent variables. In a further example, the data items may represent the structure of a molecule or other biological entity, e.g., a protein molecule, and the decoder may be used to generate output data items with similar properties to the training data items e.g., candidate drug molecules.

More generally the encoder and decoder may be configured to be conditioned on an additional data input, such as a label and/or text for generating an image, or a label and/or text and/or a speaker identifier for generating audio, for example in a text-to-speech system. The trained decoder may be used to generate an output data item of a desired type, for example for generating a waveform representing speech from natural language text.

The input and output data item may in general be any kind of digital data item. Thus in another example the input data item and output data item may each comprise tokens defining a sentence in a natural language. The encoder and/or decoder may then be used, for example, in a system for machine translation or to generate sentences representing a concept expressed in the latent variables and/or additional data. The latent variables may additionally or alternatively be used to control a style or sentiment of the generated text. In still further examples the input and output data item may comprise speech, video, or time series data generally.

In still other applications the trained VAE system and/or encoder/decoder may be used for image or other data item processing tasks such as an image or other data item completion task in which missing parts of a data item are generated or filled in by the system.

In another example, the VAE system may be used to make a personalized recommendation for a user. For example the latent variables may be used to characterize a user's taste in data items. For example where the system is trained using data items comprising identifiers of items/content which a user has selected, e.g., playlists, the distribution of latent variables may represent features characterizing the user's taste. Sampling from the distribution of latent variables may then be used generate a recommendation output data item.

In a still further example, the VAE system, and in particular the trained decoder, may be used to generate further examples of data items for training another machine learning system. For example the VAE system may be trained on a set of data items and then a set of latent variables may be determined and used generate new data items similar to those in the training data set. The set of latent variables may be determined by sampling from the (prior) distribution of latent variables and/or using the auxiliary neural network. Where the VAE system has been trained conditioned on additional data, e.g., labels, new data items may be generated conditioned on additional data, e.g., a label provided to the decoder. In this way additional labelled data items may be generated, for example to supplement a dearth of unlabeled training data items.

Thus a method of obtaining an encoder/decoder comprises training a variational autoencoder neural network system as described above and then using the trained encoder/decoder neural network as the encoder/decoder.

There is also provided a trained decoder, and a trained encoder, as described above.

There is further provided a method of encoding and/or decoding data using a trained encoder and/or decoder, as described above.

For example, in one implementation an autoregressive decoder comprises a causal convolutional neural network configured to generate a data item by, at each of a plurality of iterations, generating a value of the data item conditioned upon values of the data item previously generated at previous iterations, wherein the generating uses a soft attention query vector dependent upon the previously generated values of the data item to query a memory comprising values derived from the set of latent variables at each time step.

For example, in one implementation an anti-causal autoregressive encoder comprises a causal convolutional neural network configured to input a data item, reverse an order of values of the data item, and generate a representation of the data item from the reverse ordered values.

The subject matter described in this specification can be implemented in particular embodiments so as to realize one or more of the following further advantages.

Some implementations of the system are able to use powerful decoders, such as autoregressive decoders, to generate examples of output data items with improved fidelity, that is improved accuracy and more detail. In particular, implementations of the VAE system can be trained even when the decoder is implemented using an autoregressive technique. The system is potentially also able to learn latent variable distributions which provide an improved representation of the training data items. This in turn facilitates advantages such as reduced memory usage and better control over the generated data items. Where, for example, the system is used for data compression this may facilitate a greater degree of data compression. Some implementations of the system reduce the computational power needed for training because they are able to train faster and better than previous systems. Some implementations of the system are able to effectively model time series data such as speech and video. Some implementations of the system allow efficient computation of the objective function with closed for divergence, as described above. Some implementations of the system allow a minimum information rate between the encoder and decoder to be tuned with one parameter; this parameter can be adjusted according to the type of data items processed, for example a degree of correlation in the data items, to tune the effectiveness of the system in computational resource and memory usage.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
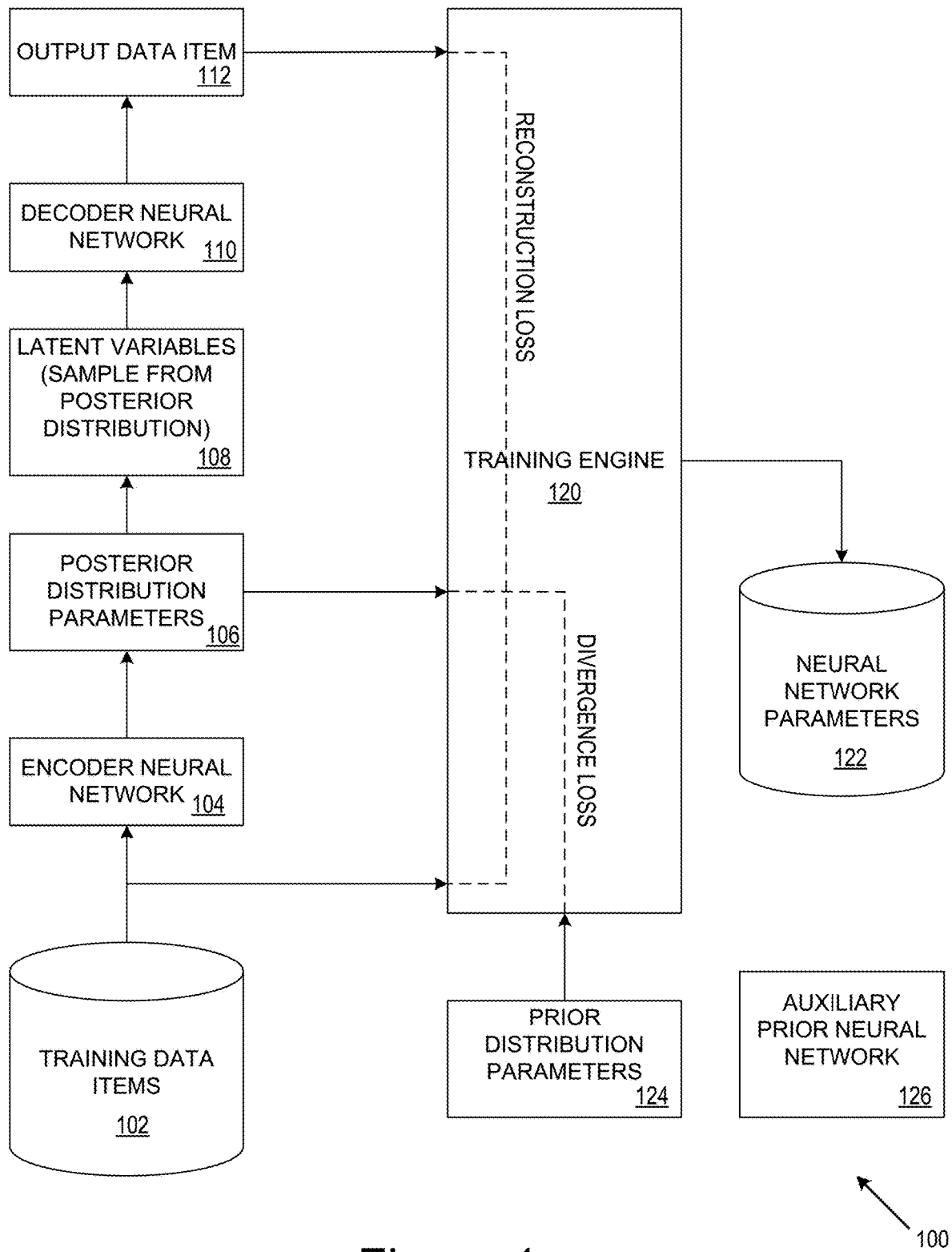
FIG. 1 shows an example variational autoencoder (VAE) neural network system.

This specification generally describes a variational auto-encoder (VAE) neural network system implemented as computer programs on one or more computers in one or more locations, and methods of training the system.

When trained the VAE neural network system comprises a trained encoder neural network and a trained decoder neural network. The encoder neural network learns to compress data from a training data distribution into a simpler distribution, represented by a set of latent variables. The decoder neural network learns to decode the set of latent variables into an example drawn from a distribution which approximates the training distribution. Thus trained VAE neural network system operates as a data compression/decompression system, with the encoder neural network acting as a data compressor and the decoder neural network acting as a complementary data decompressor.

During training the VAE learns the structure in the training data and can thus perform efficient data compression/decompression. The data may be any type of data including, for example, image data (including video), sound data and text data.

The latent variable representation from the encoder neural network can also be useful, for example, for classification and reinforcement learning tasks. The data from the decoder neural network can be used to generate examples from the training data distribution, e.g., image data, sound data, or text data examples, conditioned on a set of (latent) variables provided as an input, optionally further conditioned on a label defining the example type, e.g., image content for image data, or a natural language word for sound data.

A problem with VAE neural networks is that they can fail to train effectively due to posterior collapse, explained below. Another problem is that whilst they can be good at capturing global structure in the training data they can fail to capture more complex local structure, e.g., a generated image may appear blurred. A solution to the latter problem is to use a more powerful generative model for the decoder, i.e., one which is better able to reproduce details in the training data distribution such as image detail, but this exacerbates the posterior collapse problem.

One VAE objective function aims to maximize the probability $p(x)$ of obtaining the training data examples x from the decoder neural network (a generative model) by maximizing a lower bound on this probability $\log p(x) \geq \mathbb{E}_{z \sim q(z|x)} [\log p(x|z)] - D_{KL}(q(z|x) \| p(z))$. Here $D_{KL}$ is the Kullback-Leibler divergence; $p(z)$ defines a prior distribution for z, which should be continuous but may be otherwise arbitrary and may be, e.g., a standard Gaussian, $\mathcal{N}(0,1)$; and the encoder neural network is represented by the function $q(z|x)$, i.e., it defines parameters of an approximate posterior distribution for each component of z. Thus the encoder neural network defines parameters of a multivariate distribution for z from which a sample $z \sim q(z|x)$ is taken and provided to the decoder neural network, represented by $p(x|z)$. During training the second term can go to zero, that is a probability of the decoder producing examples which match the training data distribution examples can be maximized without using the latent variables, so-called posterior collapse. This is particularly a problem if the decoder is powerful, for example an autoregressive decoder from the PixelCNN or WaveNet family (ibid), which can generate output examples with fine detail, modelling the full data distribution without any conditioning input.

FIG. 1 shows an example variational autoencoder (VAE) neural network system 100 which addresses this problem. The VAE neural network system 100 can be implemented as computer programs on one or more computers in one or more locations.

The VAE neural network system 100 is provided with training data items, e.g., from a data store 102. These may comprise audio data items for digitized audio, e.g., in the time and/or frequency domain, or image data items including, e.g., video and/or LIDAR data items, text data items, data items defining the structure of an entity such as a molecule, or any other type of data item.

The data items are provided to an encoder neural network 104 which outputs a set of parameters 106 defining a posterior distribution of a set of latent variables, e.g., defining the mean and variance of a multivariate Gaussian distribution. The system is configured to sample values for a set of latent variables 108 from the posterior distribution. The set of latent variables may define values for a latent variable data structure such as a latent variable vector z.

The latent variables are processed using a decoder neural network 110 which generates a data item output 112. In some implementations the decoder neural network 110 generates the data item directly; in others it generates parameters of an output data item distribution which is sampled to obtain an example output data item. For example the decoder output may specify parameters of a distribution of the intensity of each pixel (or color sub-pixel) of an image, or of the value of each individual audio sample of a sound.

A training engine 120 is configured to train the VAE neural network system 100 by back-propagating gradients of an objective function, in order to update neural network parameters 122 of the encoder neural network 104 and decoder neural network 110. The training engine uses prior distribution parameters 124 of a prior distribution of the set of latent variables in conjunction with the posterior distribution parameters to determine a divergence loss term of the objective function. The training engine 120 also determines, from an input data item and a corresponding output data item, a reconstruction loss term of the objective function which aims to match a distribution of the output data items to a distribution of the training data items, e.g., $\log p(x|z)$.

In some implementations an auxiliary prior neural network 126 is provided to determine parameters of an auxiliary prior distribution, as described later. The auxiliary prior neural network 126, where present, may also be trained by training engine 120.

The $\log p(x|z)$ term of the previously described objective function is a reconstruction term and the $D_{KL}$ term encourages the system to keep the posterior distribution close to the prior. The $D_{KL}$ term measures information flow from the encoder to the decoder, more particularly a number of nats which are required, on average, to send through the latent variables from the encoder to the decoder. In implementations the training engine 120 is configured to use an objective function for which there is a guaranteed, non-zero minimum rate of information flow from the encoder to the decoder, here termed a "committed rate", δ. The rate of information flow δ is constrained to be equal to or greater than a committed or minimum rate to inhibit posterior collapse. For example a posterior-prior divergence term of the objective function, e.g., $D_{KL}(q(z|x)\|p(z)),\geq \delta$.

In implementations this may be achieved by defining a structure of the (continuous) prior distribution p(z) which is different to a structure of the posterior distribution q(z|x) such that the posterior distribution cannot be matched to the prior distribution. The structure of a distribution may be defined by an inherent shape of the distribution, e.g., whether or not it is a Gaussian distribution, and/or by constraining one or more parameters defining a shape the distribution, e.g., by defining the variance of a Gaussian distribution. In implementations the committed rate of information flow, δ, is not fixed but may be different for each data item, allowing the system to allocate more bits to more complex input data items. Metrics other than Kullback-Leibler divergence may be used for the difference between p(z) and q(z|x), e.g., the Jensen-Shannon divergence. Some example distribution structures are described later.

The application of these techniques are not dependent on any particular form or architecture of the encoder or decoder neural networks. In particular the techniques avoid posterior collapse when using a powerful decoder such as an autoregressive decoder, i.e., a decoder which is configured to generate a sequence of output data item values, $x_t$ each conditioned upon previously generated output data item values $x_{<t}$.

The latent variables in the FIG. 1 system can capture and represent global characteristics of the data items. However data items may include spatial, temporal, or other sequential variation. For example images typically have some spatial continuity, speech typically has some temporal continuity, and natural language text typically has some sequential continuity. It can be advantageous also to capture such finer, often shifting attributes variation in the latent variables, such as image texture or pose, speech tone, volume or accent, and language style or sentiment.

Thus the VAE neural network system 100 may configured to a model data item using a sequence of latent variables drawn from a sequence of prior distributions. Thus each data item may be subdivided into a sequential set of data item parts By way of example for an image data item the parts may comprise rows, columns or regions of the image; for a video data item the parts may comprise individual images; for a speech data item the parts may comprises words; for a natural language text data item the parts may comprise tokens (e.g., words, phrases, symbols and the like). Steps in the sequence may be referred to as time steps, e.g., when the data item parts are processed sequentially.

The same posterior distribution model, e.g., a (diagonal) multivariate Gaussian distribution, may be used for each step of the sequence. That is, the same encoder neural network may process each of the data item parts. However the prior distribution may change with each step in a correlated manner. More specifically the sequence of prior distributions may be an autoregressive sequence, e.g., a first order and/or linear autoregressive sequence. Thus at each time step the prior distribution may depend on the prior distribution at a previous time step. This creates a mismatch in the correlation structure between the prior and posterior distributions which results in a positive lower bound on the divergence between these distributions.

For example a latent variable vector at a time step t, $z_t$, may be defined by $z_t = \alpha z_{t-1} + \epsilon_t$ where $\epsilon_t$ is a noise component, e.g., Gaussian noise with zero mean and constant variance $\sigma_\epsilon^2$, and $|\alpha|<1$ (so that the prior distribution has constant sufficient statistics through its time evolution). Then $z_t$ has zero mean and variance $\sigma_\epsilon^2/(1-\alpha^2)$ and the choice $\sigma_\epsilon^2 = (1-\alpha^2)$ can be made so that $p(z_t|z_{t-1}) = \mathcal{N}(\alpha z_{t-1}, \sqrt{1-\alpha^2})$, facilitating determining an analytical form for the committed minimum rate of information flow, e.g., the lower bound on $D_{KL}(q(z|x)\|p(z))$. Thus during training the optimization process is allowed to settle on a rate higher than the minimum but is restricted from going below this. The different dimensions of the latent variable vector $z_t$ may, but need not, have different values of α.

In implementations the committed information rate is given by $$\delta = D_{KL}(q(z|x)\|p(z)) \geq \frac{1}{2}\sum_{k=1}^{d}(n-2)\ln(1+\alpha_k^2) - \ln(1-\alpha_k^2)$$

where n is the length of the sequence, d is the dimension of the (multidimensional) latent variable vector, and $\alpha_k$ is the value of a for each dimension. This allows choices to be made for a or $\alpha_k$ to achieve a target value for δ. In broad terms the value of α determines a degree of correlation between the prior distributions from one step to the next—with α=0 there is no correlation and as a approaches one the correlation increases. This can be viewed as variable rate feature analysis, with different values of alpha corresponding to different speeds of variation.

In implementations where the decoder comprises an autoregressive neural network, in principle the decoder neural network can accurately estimate a part of an output data item, $x_t$, given previous parts of the output data item, $x_{<t}$, which it has already generated. The set of latent variables need not, therefore, transmit this information to the decoder neural network. Thus in some implementations the encoder neural network may have an anti-causal structure, i.e., one in which the set of latent variables do not encode information about parts of the output data item which have already been generated. For example the set of latent variables may encode information about a current part of a data item in a sequence and about those parts which have yet to be generated.

Figure 2B:
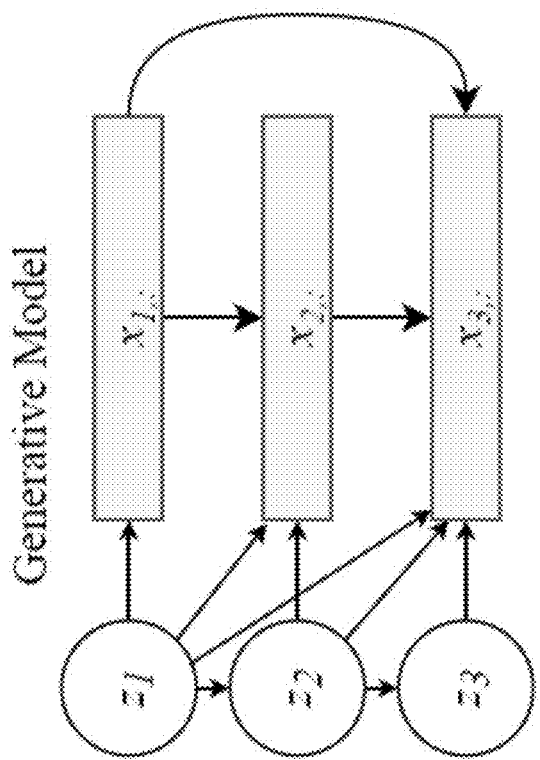
FIGS. 2a-2b illustrate the operation of an anti-causal encoder neural network, and of an autoregressive decoder neural network.
Figure 2A:
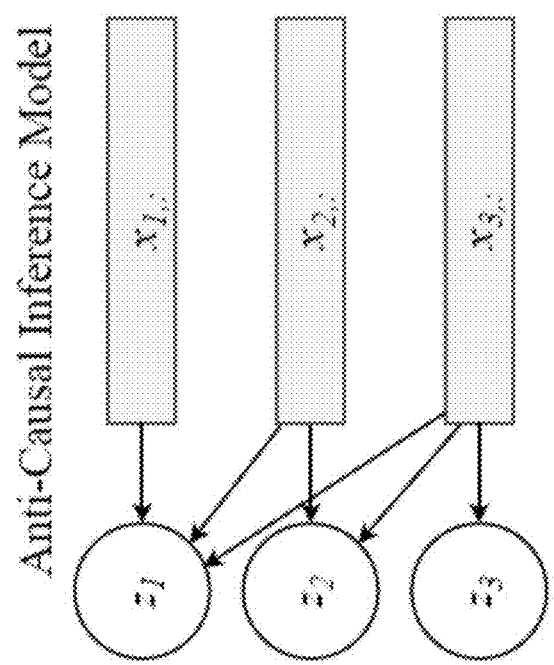

This is illustrated schematically in FIG. 2a, which shows the operation of an anti-causal inference model, i.e., an anti-causal encoder neural network: At a first time step $z_1$ is generated using information from $x_1$, $x_2$, and $x_3$; at a second time step $z_2$ is generated using information from $x_2$, and $x_3$; and at a third time step $z_3$ is generated using information from only $x_3$. In practice $x_1$, $x_2$ and $x_3$ are available in parallel and the anti-causal dependence of the encoder neural network may be defined by appropriate selection of the parts of a data item, e.g., via a mask and/or by reversing a sequential order of the parts of a data item. FIG. 2b illustrates, schematically, the autoregressive nature of a corresponding generative model, i.e., of an autoregressive decoder neural network.

Use of an anti-causal encoder neural network may further help to avoid posterior collapse, and may also increase the data compression of the system by removing potentially redundant information from the set of latent variables.

Once trained the encoder neural network 104 may be used as a data compression engine, because the set of latent variables encodes meaningful information about the global and finer features of an input data item. Fine detail may, however, be produced by the autoregressive decoder neural network 110. This approach can achieve a high data compression ratio.

The trained decoder neural network 110 may be used to generate example data item by sampling a set of latent variables from the prior distribution and providing the set to the decoder neural network 110.

Where there is a significant mismatch between the prior distribution $p(z)$ and an aggregate posterior distribution $q(z) = \mathbb{E}_{x \sim \mathcal{D}}[q(z|x)]$ for an ensemble of the training data items $\mathcal{D}$, there may be regions of the prior distribution which the decoder neural network does not see during training. Thus the VAE neural network system 100 may include an auxiliary prior neural network 126 which is trained to output parameters for an auxiliary distribution $p^{aux}$ which matches the aggregate posterior distribution. The auxiliary prior neural network 126 may be trained at the same time as the encoder and decoder neural networks but does not take part in the training of the encoder and decoder neural networks. However after training a set of latent variables may be sampled from the auxiliary prior distribution rather than from the prior distribution.

An autoregressive model may be used to estimate $p^{aux}$. For example a single layer LSTM (Long Short-Term Memory) neural network may be used to estimate parameters of a posterior distribution of the i-th latent variable $q(z_i|x)$ conditioned on previous latent variable samples, $p^{aux}(z) = \Pi_{i=1}^{n} p^{aux}(z_i|z_{<i})$ where $p^{aux}(z_i|z_{<i})$ may be a Gaussian distribution with mean and variance parameters for step i output by the LSTM after processing the previous latent variable samples. The LSTM neural network may be trained by minimizing $D_{KL}(q(z|x)\|p^{aux}(z))$.

In some implementations the VAE neural network system 100 of FIG. 1 may be modified so that the decoder neural network 110 generates output data items from a labelled class, e.g., an example image of a particular digit. This can be achieved by adding a conditioning input to both the encoder and decoder neural networks during training. The conditioning input nay be, e.g., a one hot conditioning vector c identifying a class to which a training data item belongs. A corresponding conditioning input may then be provided to the decoder neural network 110 to generate an example output data item of a specified class.

Figure 3:
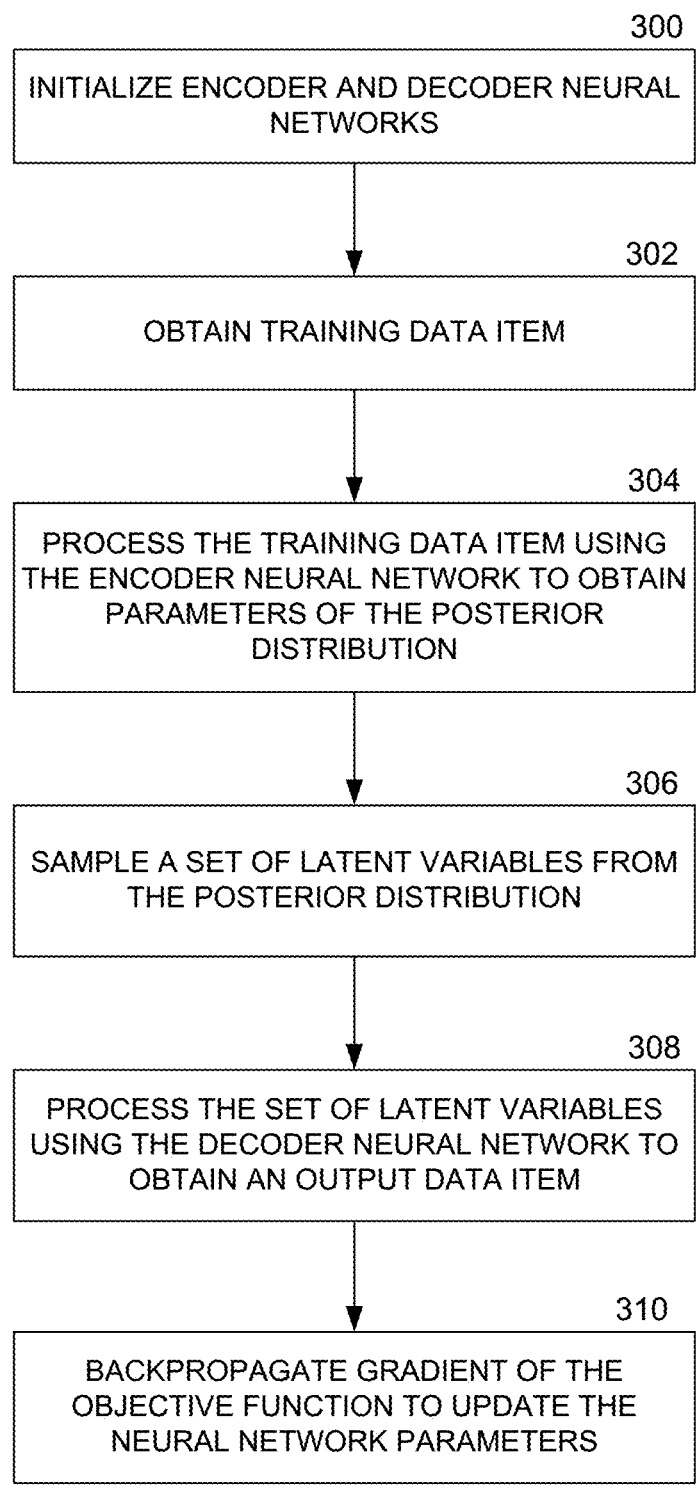
FIG. 3 shows a flow diagram of an example training process for the VAE neural network system of FIG. 1.

FIG. 3 is a flow diagram of an example training process for the VAE neural network system 100. The encoder and decoder neural network parameters are initialized, e.g., randomly (step 300), and a training data item is obtained (step 302), e.g., from data store 102. The training data item is processed using the encoder neural network 104 to obtain parameters defining the posterior distribution (step 304), and a set of latent variables is sampled from this distribution (step 306). The set of latent variables is then processed by the decoder neural network 110 to obtain an output data item (step 308), either directly or, e.g., by sampling from a multivariate distribution parameterized by an output of the decoder neural network. The process then backpropagates gradients of an objective function of the type previously described to update the parameters of the encoder and decoder neural networks. Any suitable backpropagation method may be used, e.g., Adam. To backpropagate through the latent variable sampling the "reparameterization trick" may be used, rewriting the sampling operation for each latent variable as $z = \mu + \sigma \epsilon$ where $\epsilon$ is standard Gaussian noise. The encoder neural network generates an output defining the mean ($\mu$) and variance ($\sigma^2$) of a distribution for the latent variable but the stochastic (sampling) element is provided by the noise so that gradients can be backpropagated through the "sampling" step. Gradients may be averaged over a minibatch; the process of FIG. 3 may be repeated until convergence of the neural network parameters.

Optionally gradients of an objective function for the auxiliary prior neural network are backpropagated through the auxiliary prior neural network to train this neural network in parallel with the main VAE system.

The objective function may have the general form $\log p(x|z) - D_{KL}(q(z|x)\|p(z))$. The reconstruction loss term $\log p(x|z)$ term can be evaluated from training data item and an output data item, e.g., by determining a cross-entropy loss or MSE (Mean Square Error) loss between the training data item and output data item.

The second, divergence term of the objective function, $D_{KL}(q(z|x)\|p(z))$, may be calculated from the parameters of the prior and posterior distributions. As previously described, the structures of the prior and posterior distributions are different such that they cannot be matched.

For example in one implementation the encoder neural network 104 may output a set of parameters 106 defining a multivariate Gaussian posterior distribution (with diagonal covariance) for the set of latent variables and the prior distribution may be defined by a standard Gaussian distribution (i.e., zero mean, unit variance). The KL divergence of two Gaussians $\mathcal{N}(\mu_q, \sigma_q)$, $\mathcal{N}(\mu_p, \sigma_p)$ is given by:

$$D_{KL}(\mathcal{N}(\mu_q, \sigma_q)\|\mathcal{N}(\mu_p, \sigma_p)) = \frac{1}{2}\left[\ln\left(\frac{\sigma_p^2}{\sigma_q^2}\right) + \frac{\sigma_q^2 + (\mu_p - \sigma_q)^2}{\sigma_p^2} - 1\right]$$

To calculate the KL divergence of a d-dimensional latent variable the KL divergence for each of the d-dimensions may be summed. In a simple implementation the prior and posterior Gaussian distributions may be defined to have different but fixed variance, e.g., different by a factor of $\alpha$ where $\alpha \neq 1$, to constrain $\delta$ as non-zero.

In some implementations the prior distribution is similarly defined by a standard Gaussian distribution and the posterior distribution comprises a multivariate Gaussian distribution with a mean $\mu_q$ and variance $\sigma_q^2$ and diagonal covariance, i.e., assuming that the latent variables in the set of latent variables are independent of one another. The posterior distribution is constrained by the committed rate of information flow, $\delta$, whilst allowing the rate to go above $\delta$. This can be achieved by constraining the mean $\mu_q$ and variance $\sigma_q^2$ as for each latent variable (i.e., for each component of the posterior distribution) according to $$\mu_q^2 \geq 2\delta + 1 + \ln(\sigma_q^2) - \sigma_q^2$$

This can be solved numerically for $\mu_q$ and $\delta$ to obtain a feasible interval $[\sigma_q^l, \sigma_q^u]$ where $\sigma_q^l, \sigma_q^u$ define respective lower and upper values for the variance. This in turn defines mean $\mu_q$ and variance as for the posterior distribution in terms of corresponding outputs $\mu(x)$ and $\sigma(x)$ from the encoder neural network:

$$\sigma_q = \sigma_q^l + (\sigma_q^u - \sigma_q^l)\frac{1}{1 + e^{-\sigma(x)}}$$

$$\mu_q = 2\delta + 1 + \ln(\sigma_q^2) - \sigma_q^2 + \max(0, \mu(x))$$

Where the latent variables drawn are from an autoregressive sequence of prior distributions the divergence term is given by $$D_{KL}(q(z \mid x) \| p(z)) = D_{KL}(q(z_1 \mid x) \| p(z_1)) +$$

$$\sum_{t=2}^{n} \mathbb{E}_{z_{t-1} \sim q(z_{t-1} \mid x)} [D_{KL}(q(z_t \mid x) \| p(z_t \mid z_{t-1}))]$$

Where, as previously described, $p(z_1) = \mathcal{N}(\mu_1, \sigma_1)$ is, e.g., a standard Gaussian, and for $t>1$ $z_t$ is defined such that $p(z_t \mid z_{t-1}) = \mathcal{N}(\alpha z_{t-1}, \sqrt{1-\alpha^2})$, and the posterior distribution $q(z_t \mid x)$ at time step t comprises a multivariate Gaussian distribution with a mean $\mu_t$ and variance $\sigma_t^2$ and diagonal covariance $$D_{KL}(q(z \mid x) \| p(z)) =$$

$$\frac{1}{2} \left( f(\sigma_1^2) + \mu_1^2 + \sum_{t=2}^{n} \left[ f\left(\frac{\sigma_t^2}{1-\alpha^2}\right) + \frac{(\mu_i - \alpha\mu_{i-1})^2 + \alpha^2 \sigma_{i-1}^2}{1-\alpha^2} \right] \right)$$

where $f(a) = a - \ln(a) - 1$.

Figure 4A:
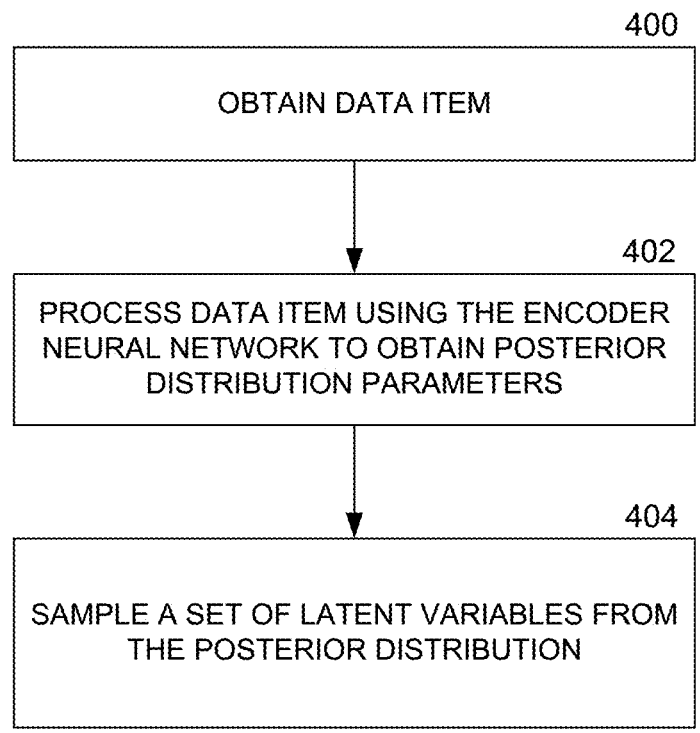
FIGS. 4a-4b show flow diagrams illustrating use of the trained encoder neural network to encode a data item, and use of the trained decoder neural network to generate a data item.

FIG. 4a shows a flow diagram of a process for using the trained encoder neural network to encode a data item, e.g., to generate a compressed representation of the data item. At step 400 the process obtains the data item, e.g., directly or indirectly from a sensor, from storage, or via a computer network or other communications link. The encoder neural network 104 then processes the data item and outputs a set of parameters defining the posterior distribution (step 402). A set of latent variables is then sampled from the posterior distribution (step 404), the set of latent variables representing an encoded, compressed representation of the data item.

Figure 4B:
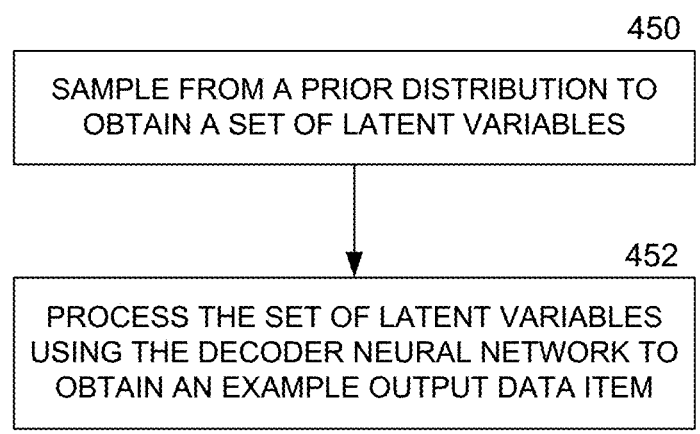

FIG. 4b shows a flow diagram of a process for using the trained decoder neural network to generate a data item. At step 450 the process samples a set of latent variables from the prior distribution, and then processes the set of latent variables using the decoder neural network 110 to generate the data item (step 452). The training process allows a valid example data item to be generated by randomly sampling from the prior, which may be a multivariate Gaussian distribution or which may be the auxiliary prior.

Figure 5:
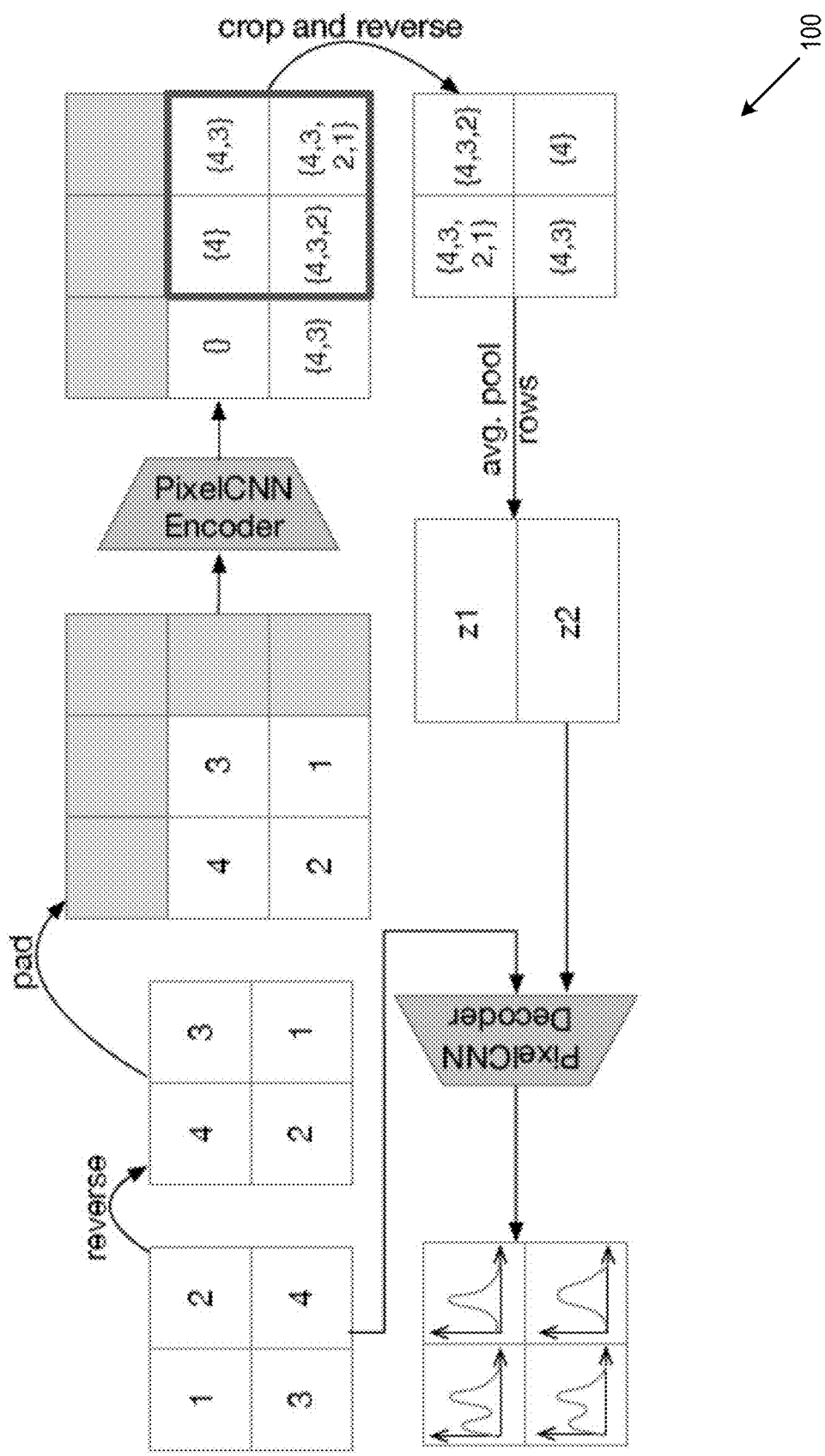
FIG. 5 shows details of an example implementation of the VAE neural network system.

FIG. 5 shows an example implementation of the VAE neural network system 100 in which both the encoder and decoder neural networks are implemented using an autoregressive approach. The techniques described in this specification are not limited to a particular form of the encoder and decoder but facilitate the use of a powerful, autoregressive decoder; it is not necessary for the encoder to be autoregressive when the decoder is autoregressive.

In the example of FIG. 5 the decoder neural network 110 comprises a PixelCNN neural network (arXiv:1606.05328) or a variant thereof such as PixelCNN++(arXiv:1701.05517) or PixelSNAIL (arXiv:1712.09763). Thus, for example, an output of the neural network may define parameters of a mixture of logistics distributions (shown schematically) which are sampled to obtain pixel values, and the neural network may incorporate attention layers, e.g., attention over an output of the encoder neural network. The encoder neural network may have the same architecture as the decoder neural network. VAE neural network system 100 may be trained using dropout and layer normalization (arXiv: 1502.03167).

As previously mentioned an anti-causal architecture can be useful for reducing posterior collapse and encouraging the latent variables to be meaningful. FIG. 5 shows one example of how an anti-causal context can be implemented when processing an image. In this particular example a pixel order of the input image is reversed and each spatial dimension is padded by one before providing the image to the encoder. An output of the encoder is cropped and reversed again, giving each pixel anti-causal context, i.e., pooling information from its own and future values (as shown in curly brackets). Each encoded pixel value may be used as a latent variable but for improved computational efficiency pooling, e.g., average pooling, may then be applied rowwise to encode each row as a multidimensional latent variable.

In implementations the VAE neural network system can be trained to produce example data items of a particular type by conditioning each of the encoder neural network and decoder neural network on an additional conditioning input during training. The conditioning input may identify the type of data item and may comprise e.g. a one-hot vector labelling the type of data item or an embedding of the type of data item. Thus the conditioning input may identify, e.g., a word or word piece in a text-to-speech system, or an image label, description, viewpoint and/or pose when generating an image.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A variational autoencoder neural network system, comprising:
an input to receive an input data item;
an encoder neural network configured to encode the input data item to determine a set of parameters defining a first, posterior distribution of a set of latent variables;
a subsystem to sample from the posterior distribution to determine values of the set of latent variables;
a decoder neural network configured to receive the values of the set of latent variables and to generate an output data item representing the values of the set of latent variables;
wherein the variational autoencoder neural network system is configured for training with an objective function which has a first term dependent upon a difference between the input data item and the output data item and a second term dependent upon a difference between the posterior distribution and a second, prior distribution of the set of latent variables, and wherein a structure of the prior distribution is different to a structure of the posterior distribution such that the posterior distribution cannot be matched to the prior distribution.

2. The variational autoencoder neural network system as claimed in claim 1 wherein the posterior distribution and the prior distribution each comprise a multivariate Gaussian distribution and wherein a variance of the posterior distribution is a factor of $\alpha$ different to a variance of the prior distribution, where $\alpha \neq 1$.

3. The variational autoencoder neural network system as claimed in claim 1 wherein the encoder is configured to determine a sequence of sets of parameters defining a sequence of distributions for a sequence of sets of latent variables, one for each of a plurality of time steps.

4. The variational autoencoder neural network system as claimed in claim 3 wherein the prior distribution comprises an autoregressive distribution such that at each time step the prior distribution depends on the prior distribution at a previous time step.

5. The variational autoencoder neural network system as claimed in claim 4 wherein the values of the set of latent variables at a time step t, are defined by a sum of a times the values of the set of latent variables at a previous time step and a noise component, where $|\alpha|<1$.

6. The variational autoencoder neural network system as claimed in claim 3, wherein the decoder neural network is an autoregressive neural network configured to generate a sequence of output data item values each conditional upon previously generated output data item values; and further comprising a system to restrict the values of the set of latent variables passed to the decoder at each time step to those which encode information about values in the sequence of output data values yet to be generated.

7. The variational autoencoder neural network system as claimed in claim 3 further comprising an auxiliary neural network configured to learn the sequence of distributions for the sequence of sets of latent variables.

8. A method of training a variational autoencoder neural network system having an encoder neural network configured to encode an input data item to determine a set of parameters defining a first, posterior distribution of a set of latent variables and a decoder neural network configured to receive values of the set of latent variables sampled from the first, posterior distribution and to generate an output data item representing the values of the set of latent variables, comprising:
receiving training data, the training data comprising training data items;
providing each training data item to an input of the variational autoencoder neural network system to generate a corresponding output data item;
determining a gradient of an objective function from a difference between the training data item and the corresponding output data item and from a difference between the posterior distribution and a prior distribution of a set of latent variables; and
backpropagating the gradient through the variational autoencoder neural network system to adjust parameters of the encoder neural network and of the decoder neural network to optimize the objective function.

9. The method as claimed in claim 8 wherein providing each training data item to the input of the variational autoencoder neural network system to generate a corresponding output data item comprises sampling from the posterior distribution to determine sampled values of the set of latent variables; the method further comprising training an auxiliary neural network concurrently with the encoder neural network and decoder neural network using the sampled values of the set of latent variables.

10. One or more non-transitory computer-readable storage media storing instructions that when executed by one or more computers cause the one or more computers to implement a variational autoencoder neural network system, the variational autoencoder neural network system comprising:
an input to receive an input data item;
an encoder neural network configured to encode the input data item to determine a set of parameters defining a first, posterior distribution of a set of latent variables;
a subsystem to sample from the posterior distribution to determine values of the set of latent variables;
a decoder neural network configured to receive the values of the set of latent variables and to generate an output data item representing the values of the set of latent variables;
wherein the variational autoencoder neural network system is configured for training with an objective function which has a first term dependent upon a difference between the input data item and the output data item and a second term dependent upon a difference between the posterior distribution and a second, prior distribution of the set of latent variables, and wherein a structure of the prior distribution is different to a structure of the posterior distribution such that the posterior distribution cannot be matched to the prior distribution.

11. The computer-readable storage media as claimed in claim 10 wherein the posterior distribution and the prior distribution each comprise a multivariate Gaussian distribution and wherein a variance of the posterior distribution is a factor of α different to a variance of the prior distribution, where $\alpha \neq 1$.

12. The computer-readable storage media as claimed in claim 10 wherein the encoder is configured to determine a sequence of sets of parameters defining a sequence of distributions for a sequence of sets of latent variables, one for each of a plurality of time steps.

13. The computer-readable storage media as claimed in claim 12 wherein the prior distribution comprises an autoregressive distribution such that at each time step the prior distribution depends on the prior distribution at a previous time step.

14. The computer-readable storage media as claimed in claim 13 wherein the values of the set of latent variables at a time step t, are defined by a sum of a times the values of the set of latent variables at a previous time step and a noise component, where $|\alpha|<1$.

15. The computer-readable storage media as claimed in claim 13, wherein the decoder neural network is an autoregressive neural network configured to generate a sequence of output data item values each conditional upon previously generated output data item values; and further comprising a system to restrict the values of the set of latent variables passed to the decoder at each time step to those which encode information about values in the sequence of output data values yet to be generated.

16. The computer-readable storage media as claimed in claim 13 wherein the variational autoencoder neural network system further comprises an auxiliary neural network configured to learn the sequence of distributions for the sequence of sets of latent variables.

* * * * *